United States Patent [19]

Gutierrez

[11] 4,231,998

[45] Nov. 4, 1980

[54] METHOD FOR SEPARATING CARBON BLACK FROM FIBERGLASS

[75] Inventor: Manuel M. Gutierrez, Westminster, Colo.

[73] Assignee: Tosco Corporation, Los Angeles, Calif.

[21] Appl. No.: 938,486

[22] Filed: Aug. 31, 1978

[51] Int. Cl.$^3$ .......................... C01B 31/02; C09C 1/48
[52] U.S. Cl. ..................................... 423/449; 423/450; 65/23; 209/11; 209/20
[58] Field of Search ....................... 423/449, 450, 461; 65/23; 209/11, 3, 20, 138

[56] References Cited

U.S. PATENT DOCUMENTS

| | | | |
|---|---|---|---|
| 3,253,897 | 5/1966 | Falls | 65/23 X |
| 3,831,747 | 8/1974 | Scott et al. | 209/11 |
| 4,038,100 | 7/1977 | Haberman | 423/449 X |

*Primary Examiner*—O. R. Vertiz
*Assistant Examiner*—Gregory A. Heller
*Attorney, Agent, or Firm*—Poms, Smith, Lande & Rose

[57] ABSTRACT

In processes for making carbon black from automobile tires containing fiberglass, or the like, a mat of fiberglass strands intertwined with carbon black trapped in the interstices thereof can be produced. The present invention discloses method and apparatus of producing useful fiberglass and carbon black from such mats. Rapid agitation breaks the mat into a cloud of fine fiberglass particles and free carbon black. A low velocity airstream carries the particles to a separation zone wherein the free carbon black is filtered from the airstream as a first useful by-product. The fiberglass particles are then combusted to remove remaining carbon black carried therewith thus forming a second useful by-product.

4 Claims, 1 Drawing Figure

U.S. Patent Nov. 4, 1980 4,231,998
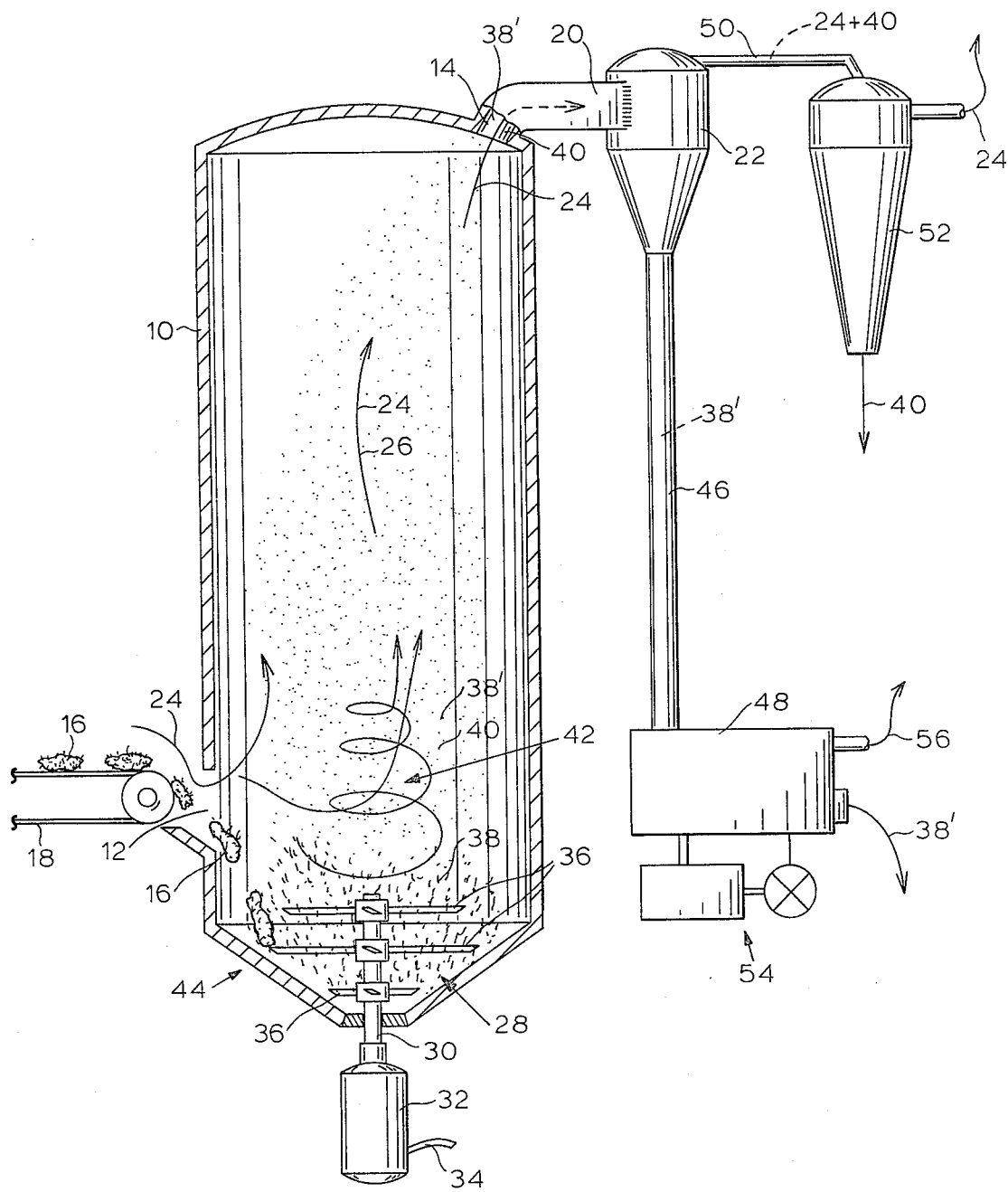

METHOD FOR SEPARATING CARBON BLACK FROM FIBERGLASS

BACKGROUND OF THE INVENTION

The present invention relates to processes for making carbon black and, more particularly, to methods and apparatus for recovering carbon black trapped within a matrix of fiberglass strands.

Ecology and the recovery of recyclable materials as a replacement for the use of natural raw materials has increased greatly in the last decade. As a beneficial side benefit, such recovery and recycling also eliminates the necessity for disposing of waste materials.

One such recovery method is shown in the U.S. Pat. No. 4,038,100 to Haberman entitled, "CHAR COMPOSITION AND A METHOD FOR MAKING A CHAR COMPOSITION". In this patent, it is disclosed how a useful char composition can be produced from rubber containing polymeric hydrocarbons and carbon black by pyrolyzing and grinding such rubber with heated balls for a sufficient length of time to vaporize and depolymerize the hydrocarbons and to produce a solid char material having a very fine particle size. The char thus produced is free of non-decomposed rubber and coke and has a benzine discoloration number of greater than 70% and preferably 90%. The source of the rubber as primarily visualized by Haberman is tires such as those on automobiles, trucks, and the like.

Since many of the tires produced today contain fiberglass and/or steel belting materials, the char produced by the method of Haberman contains unwanted fiberglass and steel particles which must be removed. The steel particles are easily removed by magnetic means to be recycled. The fiberglass is removed by passing the char over a fine mesh screen through which the extremely fine carbon black particles may pass but whereupon the fiberglass particles are trapped forming a fiberglass mat of, typically, one to four inches in thickness.

These mats as removed from the filter screen from the Haberman process represent a presently waste by-product containing two potentially useable components, fiberglass and carbon black. The mats typically contain from 30 to 50 percent fiberglass and 50 to 70 percent carbon black. It is the object of the present invention to provide a method and apparatus for recovering these two potentially useful by-products and eliminating the mats as a waste by-product of the Haberman process.

SUMMARY

The foregoing objective has been met by the present invention by a method comprising the steps of passing the mat through an agitating member to at least partially break the mat into a cloud of fiberglass particles and free carbon black particles; passing an airstream through the cloud of sufficient velocity to pick up and carry off free carbon black particles and substantially carbon free fiberglass particles and not pick up and carry off fiberglass particles carrying carbon in combination therewith; separating the free carbon black particles from the substantially carbon black free fiberglass particles; collecting the separated free carbon black particles as a first useful by-product; and, combusting the separated fiberglass particles to remove any remaining carbon black carried thereby to form carbon black free fiberglass particles as a second useful by-product. As disclosed by the preferred embodiment, the combusting process of the fiberglass particles takes place at a range of from 500° to 550° C.

To practice the foregoing method, apparatus is disclosed comprising an enclosure having an inlet and an outlet disposed to create a rising air column within the enclosure when air is passed through the enclosure between the inlet and the outlet; agitating means such as a plurality of rotating knives disposed within the enclosure for breaking at least a portion of the mats placed within the enclosure into a cloud of fiberglass particles and free carbon black particles; power means for driving the agitating means; means connected to the enclosure for creating an airstream through the enclosure between the inlet and the outlet, the airstream being of sufficient velocity that free carbon black particles and substantially carbon black free particles only are lifted against the force of gravity by the rising air column to exit the enclosure through the outlet; first separation means connected to receive the airstream exiting the outlet for separating the substantially carbon black free particles from the airstream (for example as shown in the preferred embodiment, a cyclone separator); second separation means connected to the first separation means for receiving the airstream therefrom and for separating the free carbon black particles from the airstream (for example as shown in the preferred embodiment, a bag filter); and, combustor means connected to the first separation means for receiving the separated carbon black free particles and combusting the particles to burn off any remaining carbon black carried thereby.

DESCRIPTION OF THE DRAWING

The single FIGURE shows a simplified partially cut-away elevation of apparatus according to the present invention for practicing the method thereof.

DESCRIPTION OF THE PREFERRED EMBODIMENT

Referring to the single drawing, the apparatus of the present invention is shown as primarily comprising an enclosure 10 having an inlet 12 adjacent the bottom end and an outlet 14 adjacent the upper end. The inlet 12 is adapted to receive pieces of fiberglass mat 16 as from a conveyor belt 18 which forms no part of the present invention. The inlet 20 of a cyclone separator 22 is connected to the outlet 14. Cyclone separator 22 is of the motor-driven type whereby when operating, air 24 is drawn through inlet 12 of enclosure 10 to form a rising air column (as indicated by the arrow 26) within enclosure 10 exiting the outlet 14 into the cyclone separator 22 through inlet 20.

An agitating member, generally indicated as 28, is disposed in the bottom of the enclosure 10. Agitating member 28 comprises a shaft 30 connected on the outside of enclosure 10 to a drive motor 32 which rotates the shaft 30 when connected to an appropriate source of power (not shown) by the power cable 34 thereof. Within the enclosure 10, a plurality of rotating blades 36 are attached to shaft 30. When shaft 30 rotates, the blades 36 are rotated rapidly in combination therewith to break apart the pieces of fiberglass mat 16 coming in contact therewith into fiberglass particles 38 and free carbon black particles 40. The free carbon black particles 40 and fiberglass particles 38' which are substantially free of any adhering carbon black are very light and are forced upward by the rotating blades 36 to form a cloud 42 of particles 38' and 40 within the enclosure 10. The stream of air 24 entering inlet 12, rising as column 26, and exiting through outlet 14 passes through the cloud 42 picking up and carrying these light particles 38' and 40 against the force of gravity and out the outlet 14. The unbroken pieces of fiberglass mat 16 and the heavier fiberglass particles 38 not carried off by the stream of air 24 fall back into the rotating blades 36 and recycle therethrough until sufficiently broken apart to leave the enclosure 10 with the lighter particles. To aid in this process, the lower portion 44 of enclosure 10 is sloped inwardly towards the rotating blades 36 to guide the fiberglass mats 16 and recycle the particles 38 into the rotating blade 36.

Air 24 entering the inlet 20 of cyclone separator 22 carries the light substantially carbon black free fiberglass particles 38' and free carbon black particles 40 with it. Within the cyclone separator 22, the fiberglass particles 38' are separated from the air 24 containing the free carbon black particles 40. The fiberglass particles 38' fall through duct 46 into a combustor 48 while the air 24 and free carbon black particles 40 pass through duct 50 to the inlet of a separator 52 such as a bag filter capable of removing the free carbon black particles 40 as a first useful by-product as shown and exhausting the clean air 24 substantially free of any carbon black particles 40.

Combustor 48 has means, generally indicated as 54, associated therewith for maintaining the temperature within combustor 48 at, preferably, 500°-550° C. At this temperature, any carbon black remaining on the fiberglass particles 38' is burned away to exit with the exhaust gases 56 while the fiberglass particles 38' are exited as the second useful by-product of the process and apparatus.

Thus, it can be seen that by the foregoing method and apparatus of the present invention the fiberglass mats 16 produced as a by-product of the aforementioned Haberman patent process are completely disassociated into their useful components to eliminate the mats 16 as a disposal problem and to provide fiberglass (i.e. particles 38') and carbon black (i.e. particles 40) as useful by-products.

Having thus described my invention, I claim:

1. In a process for pyrolyzing and grinding rubber containing polymeric hydrocarbons, carbon black and fiberglass which yields a product comprising a mat of fiberglass strands containing carbon black trapped in the interstices thereof, and separating the product into useful carbon black and fiberglass wherein the improvement comprises the steps of:

(a) passing the mat through an agitating member to at least partially break said mat into a cloud of fiberglass particles and free carbon black particles;

(b) passing an airstream through said cloud of sufficient velocity to pick up and carry off free carbon black particles and substantially carbon free fiberglass particles and not pick up and carry off fiberglass particles carrying carbon black in combination therewith;

(c) separating said free carbon black particles from said substantially carbon black free fiberglass particles;

(d) collecting said separated free carbon black particles as a first useful by-product; and, (e) combusting said separated fiberglass particles to remove any remaining carbon black carried thereby to form carbon black free fiberglass particles as a second useful by-product.

2. The method of claim 1 and additionally comprising the step of:

recycling the carbon black carrying fiberglass particles not carried off by the low velocity airstream back through said agitating member.

3. The method of claim 1 wherein:

said step of combusting said separated fiberglass particles to remove any remaining carbon black carried thereby comprises the step of heating said fiberglass particles to a range of 500°-550° C. for a period of time sufficient to burn off any remaining carbon black carried thereby.

4. A process for separating mats of fiberglass strands containing carbon black trapped in interstices thereof into useful carbon black and fiberglass comprising the steps of:

(a) passing the mat through an agitating member to at least partially break said mat into a cloud of fiberglass particles and free carbon black particles;

(b) passing an airstream through said cloud of sufficient velocity to pick up and carry off free carbon black particles and substantially carbon free fiberglass particles and not pick up and carry off fiberglass particles carrying carbon black in combination therewith;

(c) separating said free carbon black particles from said substantially carbon black free fiberglass particles;

(d) collecting said separated free carbon black particles as a first useful by-product; and, (e) combusting said separated fiberglass particles to remove any remaining carbon black carried thereby to form carbon black free fiberglass particles as a second useful by-product.

* * * * *